United States Patent [19]

Dougall

[11] 3,722,932
[45] Mar. 27, 1973

[54] CONNECTING APPARATUS FOR TOOTH ADAPTER ASSEMBLY

[75] Inventor: James R. Dougall, New Brighton, Minn.

[73] Assignee: Minneapolis Electric Steel Castings Company, Minneapolis, Minn.

[22] Filed: Nov. 10, 1971

[21] Appl. No.: 197,243

[52] U.S. Cl. ..........287/103 D, 24/263 DD, 312/111, 312/140, 287/20.92 G, 85/8.3, 37/142 A, 306/1.6
[51] Int. Cl.................................................F16b 7/00
[58] Field of Search.....287/103 D, 103 R, 53 LK, 53 TK, 287/20.92 G; 249/219 R, 219 W; 24/263 DD; 37/142 A; 339/74, 217 S; 306/1.5, 1.6

[56] References Cited

UNITED STATES PATENTS

| | | | |
|---|---|---|---|
| 3,121,289 | 2/1964 | Eyolfson | 287/103 R |
| 3,478,305 | 11/1969 | Chirumbolo | 339/217 S |
| 3,572,785 | 3/1971 | Larson | 287/103 R |

FOREIGN PATENTS OR APPLICATIONS

| | | | |
|---|---|---|---|
| 638,908 | 3/1962 | Canada | 37/142 A |
| 198,977 | 10/1965 | Sweden | 287/53 TK |

*Primary Examiner*—David J. Williamowsky
*Assistant Examiner*—Wayne L. Shedd
*Attorney*—John S. Sumners et al.

[57] ABSTRACT

Apparatus for removably connecting a digger tooth adapter to an excavating shovel. The adapter and lip of the shovel fit together in overriding relation, with openings in each aligning to form a passage which receives a C-shaped clamp and wedge. The back side of the C-clamp has a rectangular recess which receives a locking member. The locking member has an exposed face which is serrated, and it is urged out of the recess by a resilient mounting pad. The wedge also has a serrated face which mateably engages the locking member. To simplify removal of the adapter from the shovel, a longitudinal groove is formed in the engaging face of the wedge which extends through and below the serrations. A partial groove is formed in the C-clamp, and the grooves together guidably receive a spike therebetween which, upon insertion, separates the respective serrated faces and enables the wedge to be removed.

7 Claims, 7 Drawing Figures

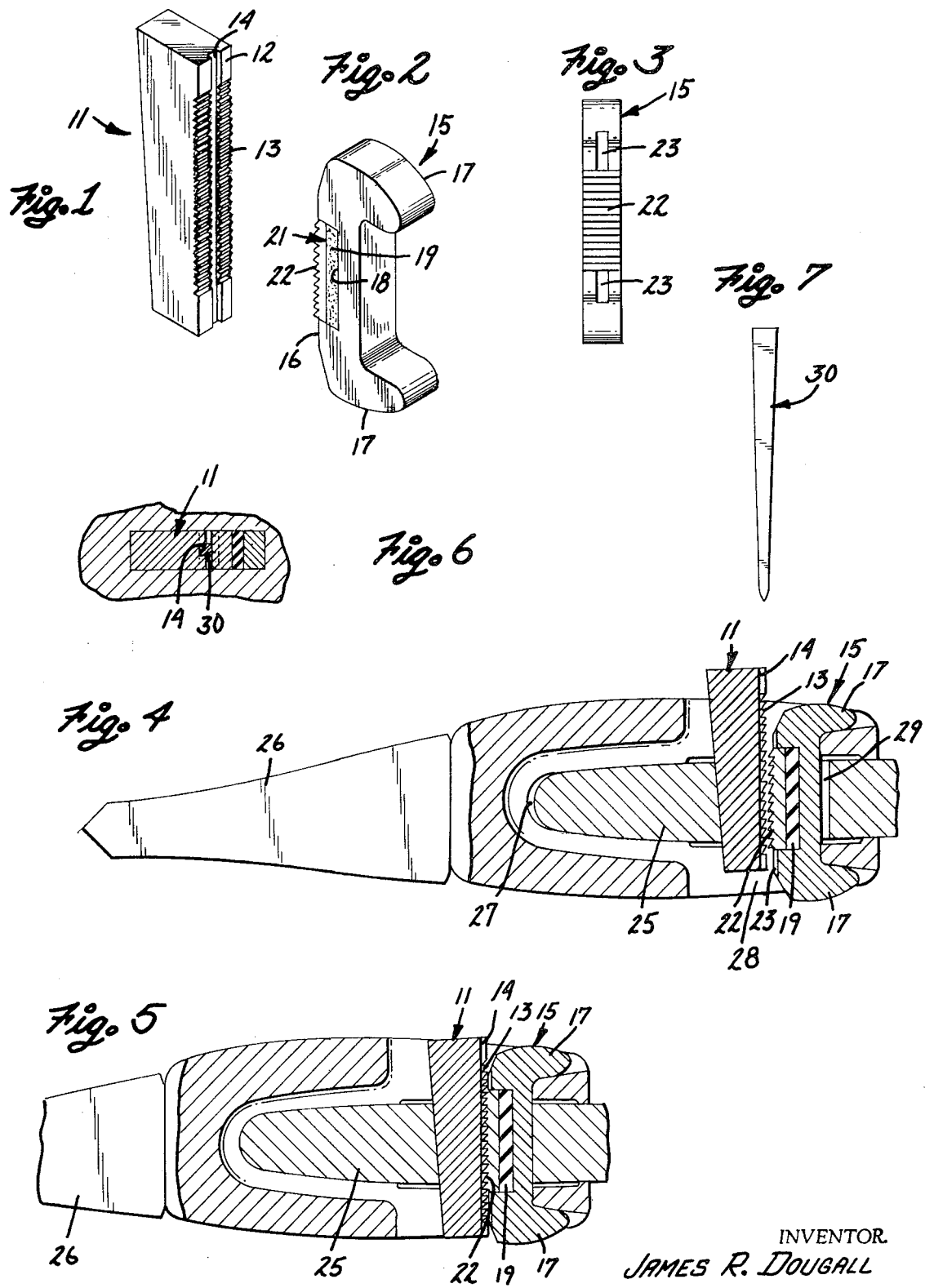

CONNECTING APPARATUS FOR TOOTH ADAPTER ASSEMBLY

The invention is generally related to the field of connecting devices for heavy machinery, and is specifically intended for use with tooth adapter assemblies for excavating shovels. The excavation and processing of ore and hard rock requires heavy machinery which is subject to rapid and excessive wear. The existing practice for some ore processing machinery is to make the ore-engaging parts subject to such wear replaceable through the use of adapters. Excavating shovels, for instance, include digger tooth adapter assemblies which are removably connected to the shovel lip and carry replacement digger teeth which can be removed and replaced when worn.

One of the more common methods of connecting a tooth adapter to a shovel lip employs a C-shaped clamping block which is used in combination with a wedge. Transverse openings are formed in the adapter and shovel lip, and when these members are brought together in overlapping relation, the openings align together to form a continuous passage at the point of connection. The C-shaped block is initially inserted into the passage, and the wedge is thereafter driven into the remaining passage space to form the connection.

One of the primary disadvantages with this type of connection lies in its tendency to loosen through vibration and shock, which can result in loss of the tooth adapter if the connecting parts fall away.

U.S. Pat. No. 3,572,785, which issued to Darrell R. Larsen on Mar. 30, 1971 and is assigned to the same assignee as the present invention, is directed to an improved connecting apparatus which, when properly inserted, insures that the adapter will not be disconnected from the shovel. In the preferred embodiment of the aforesaid Larsen patent, the wedge has a rectangular recess formed in one face which receives an undulated engagement member. The engagement member is normally urged away from the recess by a resilient mounting pad. The back side of the C-clamp is also formed with undulations that mateably engage with the engagement member. Consequently, the wedge is driven into the continuous passage, the respective undulating portions mateably engage and are held in such engagement through outward urging of the engagement member.

The present invention is an improvement of the Larsen connecting apparatus, and has as its objective a simpler removal of the wedge and C-shaped block when replacement of the adapter tooth assembly is necessary. In the preferred embodiment of the invention, I provide the wedge with a serrated engaging surface and dispose a serrated engagement member into a rectangular recess in the C-clamp. A resilient mounting pad is again used to urge the engagement member from the recess, and the respective serrated portions are constructed so that, when in mating engagement, relative movement between the wedge and C-block is possible only in the direction of positive wedging movement. In other words, each individual serration has an angular side which permits sliding movement with the angular side of the opposed serration; but the opposite side forms a shoulder which abuts the opposed side and precludes relative sliding movement in the opposite direction. Thus, once the wedge is inserted into the continuous passage, it is limited from further forward movement by virtue of its wedging relation, and is precluded from rearward movement by the serrated engagement surface.

To permit the removal of the wedge, I provide a longitudinal groove through the serrated engaging surface of the wedge, and a partial groove in the back side of the C-clamp which terminates at the recess. These grooves are in substantial alignment when the block and wedge are in connecting position, and together they guidably receive a spike or smaller wedge which, upon insertion, separates the serrated surfaces. When completely separated, the wedge can be removed from the continuous passage, thereby allowing disengagement of the tooth adapter assembly from the shovel.

BRIEF DESCRIPTION OF THE DRAWINGS

FIG. 1 is a perspective view of a wedge forming part of the inventive connecting apparatus;

FIG. 2 is a perspective view of a C-clamp used in conjunction with the wedge of FIG. 1;

FIG. 3 is a front elevational view of the C-clamp;

FIG. 4 is a partial sectional view of the tooth adapter assembly being connected to the lip of an excavating shovel by the C-clamp and wedge connector;

FIG. 5 is the view of FIG. 4 with the wedge in place;

FIG. 6 is a sectional view taken generally along the line 6—6 of FIG. 5 with a separating wedge inserted;

FIG. 7 is a side elevational view of a separating wedge.

DESCRIPTION OF THE PREFERRED EMBODIMENT

With initial reference to FIG. 1, a wedge represented generally by the numeral 11 is shown to comprise a tapered, elongated member which is essentially rectangular in cross-section. Wedge 11 has an engaging face 12 the greater portion of which is formed with teeth members or serrations 13. A longitudinal groove 14 extends through the serrated portion 13 from one end of the wedge 11 to the other. In the preferred embodiment, the groove 14 is uniformally rectangular in cross-section, although it will be appreciated that other configurations would be suitable.

With reference to FIGS. 2 and 3, a C-clamp or block represented generally by the numeral 15 comprises an elongated portion 16 with projections 17 extending laterally from either end. In the back side of C-clamp 15 intermediate its ends, a rectangular recess 18 is formed.

Disposed in recess 18 are a resilient pad 19 and engagement or locking member 21. The length of member 21 is slightly less than the length of recess 18 in order that it can move depthwise of the recess; but longitudinal movement of member 21 relative to the C-clamp 15, in response to a shearing force, is substantially precluded by the abutment of its ends with the ends of the recess 18. The purpose of the pad 19 is to provide a resilient backing for the locking member 21, and to normally urge the member 21 out from the recess 18. Preferably, the pad 19 is made of rubber and is bonded or adhesively secured to both the bottom surface of recess 18 and the back surface of locking member 21.

The front face of locking member 21 is serrated, as shown at 22, the individual teeth or serrations complementing the serrations 13 of wedge 11 to permit a mateable engagement therewith. With particular reference to FIGS. 4 and 5, it can be seen that each of the serrations 22 has an angular side which slidably engages the corresponding side of one of the serrations 13 to permit sliding movement of the wedge 11 relative to C-clamp 15 in one direction; and an abutting side or face which cooperates with the abutting faces of the serrations 13 to preclude relative movement between the wedge 11 and the C-clamp 15 in the opposite direction.

With specific reference to FIG. 3, it can be seen that partial grooves 23 are formed in the back side of C-clamp 15, the grooves 23 conforming generally in size, shape and position to the groove 14 to permit substantial alignment therewith when the members are in their connecting position.

FIGS. 4 and 5 show the wedge 11 and C-clamp 15 in combination with a tooth adapter assembly 24 and the lip 25 of an excavating shovel. The adapter assembly 24 carries a digging tooth 26 by means not shown. A horizontal opening 27 is formed in tooth adapter 24 in a conventional manner to receive the shovel lip 25 in overlapping relation. Both tooth adapter 24 and shovel lip 25 have vertical or transverse openings, designated 28 and 29, respectively, which become aligned to form a continuous vertical or transverse passage when tooth adapter 24 and lip 25 are properly engaged. Transverse openings 28 and 29 must both be of sufficient dimension to enable the projections 17 of C-clamp 15 to pass therethrough. Projections 17 must be spaced sufficiently apart to receive and engage the thickness of tooth adapter 24, as shown.

With C-clamp 15 oriented in its proper position with respect to the tooth adapter 24, wedge 11 can be driven into the continuous transverse passage defined by vertical openings 28 and 29. As will be appreciated, the angular formation of the serrations 13 and 22 permits movement of the wedge 11 only in the downward or wedging direction. As wedge 11 moves in this direction, the locking member 21 is forced further into the recess 18 against the resilient pad 19, the result being, in essence, a ratchet movement. Wedge 11 is shown fully inserted in FIG. 5.

FIG. 7 shows a removing wedge or spike 30, which is used to separate the adapter assembly 24 from shovel lip 25. Spike 30 has a thickness which permits it to be driven into the aligned grooves 14 and 23, and its width is such that, upon insertion, the locking member 21 will be separated from wedge 11. FIG. 6 shows the entire assembly in section with spike 30 in full engagement with the leading edges or apexes of serrations 22. As shown, the serrations 22 are entirely separated from the serrations 13, thus enabling the wedge 11 to be driven out of the continuous transverse passage. C-clamp 15 can then be removed from its position in the transverse passage, which enables tooth adapter 24 to be taken from shovel lip 25 for maintenance, repair or replacement.

From the foregoing, it will be apparent that a longitudinal groove can be used on either or both the wedge 11 and C-clamp 15, so long as it is properly dimensioned and arranged to permit the insertion of spike 30 to separate the locking faces. Although I prefer to use serrations as described to permit rearward movement of the wedge 11 after it has been driven in place it should be emphasized that the invention is equally applicable to mateably engaging faces of different configurations.

I claim:

1. Apparatus for removably connecting separable parts, the parts fitting together in overlapping relation and each having an opening, the respective openings being alignable to form a continuous passage when the parts are brought together, the connecting apparatus comprising:
    a. an elongated block having projections extending laterally from either end, the projections being of such length as to permit insertion of the block into the continuous passage and spaced to receive one of the two parts therebetween;
    b. a wedge dimensioned for insertion into the passage in wedging relation between the block and the other of the two parts;
    c. one of said elongated block and wedge having an engaging face;
    d. the other of said elongated block and wedge having a recess intermediate its ends;
    e. a locking member having an engaging face disposed in the recess;
    f. means for resiliently urging the locking member from the recess;
    g. the respective engaging faces being constructed and arranged to mateably engage and to resist relative longitudinal movement between the elongated block and wedge;
    h. a longitudinal groove formed in at least one of said elongated block and wedge in relation to the associated engaging face;
    i. and a longitudinal wedging member sized for insertion into said groove to be guided thereby, the wedging member being shaped to separate said mateably engaging surfaces upon insertion into said groove.

2. The apparatus defined by claim 1, wherein the longitudinal groove is formed in said one of the elongated block and wedge, extending through the engaging face thereof.

3. The apparatus defined by claim 1, wherein the longitudinal groove is formed in the other of said elongated block and wedge, the groove extending to and terminating at each side of the recess.

4. The apparatus defined by claim 1, wherein the groove is uniformly rectangular in cross-section, and the wedging member is tapered.

5. The apparatus defined by claim 1, wherein the mateable engaging faces are serrated, the serrations being angularly constructed and arranged to prevent removal of the wedge from a wedging position in said continuous passage.

6. The apparatus defined by claim 1, wherein a longitudinal groove is formed in each of said elongated block and wedge, the grooves being alignably disposed to guideably receive the wedging member.

7. The apparatus defined by claim 1, wherein the resilient urging means comprises a resilient pad disposed in the bottom of said recess.

* * * * *